(12) United States Patent  
Matsumoto (10) Patent No.: US 8,665,602 B2
(45) Date of Patent: Mar. 4, 2014

(54) BUS BAR DEVICE AND FUSIBLE LINK UNIT (75) Inventor: Yusuke Matsumoto, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 177 days.

(21) Appl. No.: 13/258,074

(22) PCT Filed: Mar. 23, 2010

(86) PCT No.: PCT/JP2010/054962
§ 371 (c)(1),
(2), (4) Date: Sep. 21, 2011

(87) PCT Pub. No.: WO2010/110257
PCT Pub. Date: Sep. 30, 2010

(65) Prior Publication Data
US 2012/0020036 A1 Jan. 26, 2012

(30) Foreign Application Priority Data

Mar. 23, 2009 (JP) ................................ 2009-070319

(51) Int. Cl.
*H01K 5/00* (2006.01)
(52) U.S. Cl.
USPC .......................................................... 361/752
(58) Field of Classification Search
USPC .................................. 361/752; 337/283, 290
See application file for complete search history.

(56) References Cited

U.S. PATENT DOCUMENTS

| | | | |
|---|---|---|---|
| 8,130,070 B2 * | 3/2012 | Shibata | ......................... 337/283 |
| 2004/0132335 A1 | 7/2004 | Kosuge | |
| 2008/0030208 A1 * | 2/2008 | Aratani | ......................... 324/713 |
| 2008/0030295 A1 | 2/2008 | Matsumoto et al. | |
| 2009/0061291 A1 | 3/2009 | Ohashi et al. | |

(Continued)

FOREIGN PATENT DOCUMENTS

| | | |
|---|---|---|
| CN | 1505183 A | 6/2004 |
| CN | 1830125 A | 9/2006 |

(Continued)

OTHER PUBLICATIONS

International Search Report (PCT/ISA/210) issued on Jun. 29, 2010 in the International Patent Application No. PCT/JP2010/054962.

(Continued)

*Primary Examiner* — Bernard Rojas
(74) *Attorney, Agent, or Firm* — Sughrue Mion, PLLC (57) ABSTRACT

A bus bar device 1 includes a bus bar 2 connected to a battery post 52 provided in a battery 50, an insulative housing 3 that covers the bus bar 2, a circuit board 5 attached to the housing 3 and an electronic parts 4 mounted on the circuit board 5. The bus bar 2 includes a first flat plate part 9 having a battery attaching part 13 to which the battery post 52 is attached, a second flat plate part 11 having a first parallel part 16 parallel to the first flat plate part 9 and an electric wire connecting part 21 extended from the first parallel part 16 to connect a terminal fitting of an electric wire connected to a load and a third flat plate part 10 provided between the second flat plate part 11 and the first flat plate part 9 and arranged in parallel with the circuit board 5. The third flat plate part 10 is provided in a direction intersecting the first flat plate part 9.

6 Claims, 8 Drawing Sheets

(56) References Cited

U.S. PATENT DOCUMENTS

2009/0075163 A1     3/2009    Shevock et al.
2009/0250237 A1*   10/2009   Akahori et al. .............. 174/68.2
2010/0066350 A1     3/2010    Matsumura et al.
2011/0241649 A1*   10/2011   Ozawa ....................... 324/76.11

FOREIGN PATENT DOCUMENTS

| | | |
|---|---|---|
| JP | 2002-280083 A | 9/2002 |
| JP | 2008-4327 A | 1/2008 |
| JP | 2008-41379 A | 2/2008 |
| JP | 2008-234945 A | 10/2008 |
| JP | 2009-56992 A | 3/2009 |
| JP | 2010-71777 A | 4/2010 |
| JP | 2010-123517 A | 6/2010 |

OTHER PUBLICATIONS

Written Opinion (PCT/ISA/237) issued on Jun. 29, 2011 in the International Patent Application No. PCT/JP2010/054962.

* cited by examiner

BUS BAR DEVICE AND FUSIBLE LINK UNIT

TECHNICAL FIELD

The present invention relates to a bus bar device and relates to a bus bar device including a bus bar to which a current is supplied from a battery, an insulative housing for covering the bus bar, a circuit board attached to the housing and electronic parts mounted on the circuit board.

BACKGROUND ART

A related bus bar device disclosed in Japanese Patent Application No. 2008-238955 filed by the applicant of the present invention is described below as a reference example. A bus bar device 901 shown in FIGS. 9 and 10 includes a bus bar 902 as an electric conductor to which a current is supplied, an insulative housing 903 which covers the bus bar 902, a circuit board 905 attached to the housing 903, a Hall IC 904 (an electronic parts) mounted on the circuit board 905 to detect a magnetic flux density of a magnetic field generated when the current is supplied to the bus bar 902 and an external output terminal 907 attached to the circuit board 905 to output outside an electric signal of the Hall IC 904.

Figure 10:
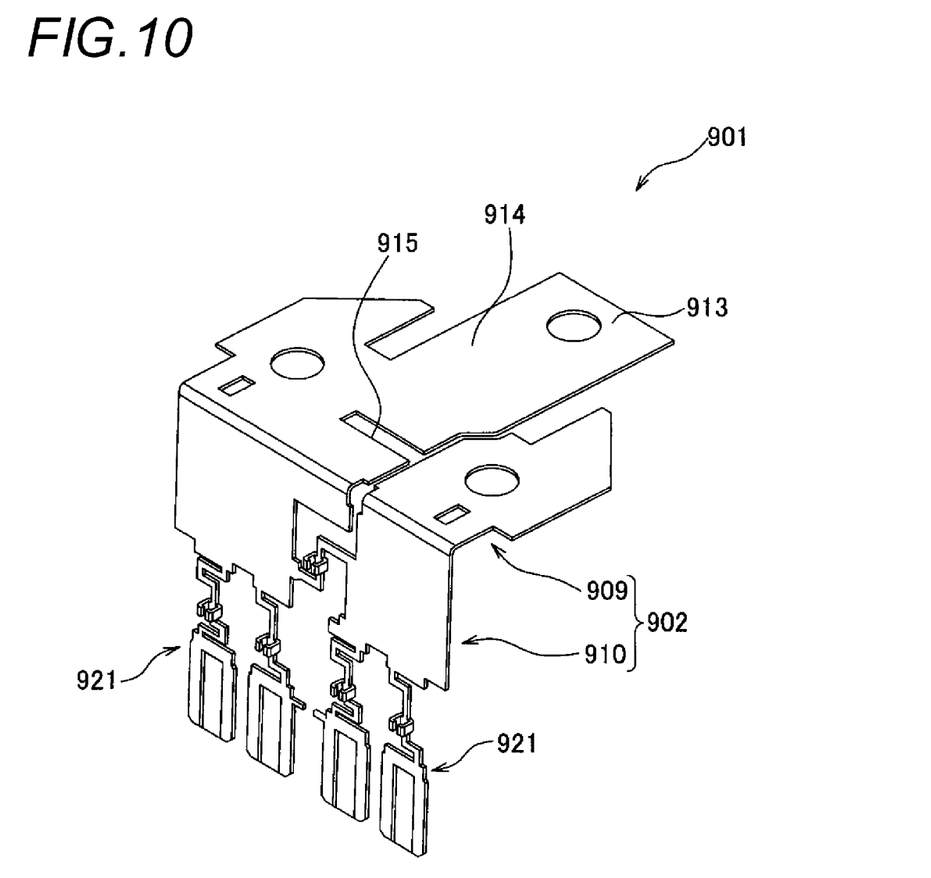
[FIG. 10] is a perspective view of a bus bar forming the related bus bar device shown in FIG. 9.

The bus bar 902 is formed substantially in the shape of L by a first flat plate part 909 and a second flat plate part 910 connected to the first plate part 909 as shown in FIG. 10.

Figure 9:
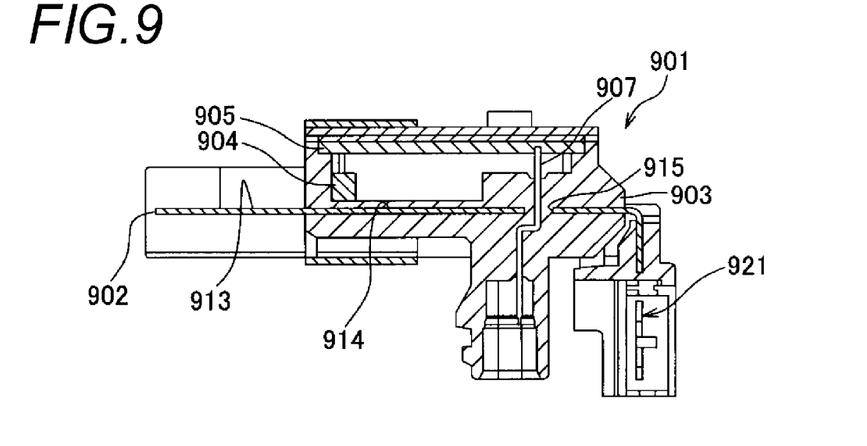
[FIG. 9] is a sectional view showing one example of a related bus bar device.

The bus bar 902 includes a battery attaching part 913 connected to a battery post (not shown in the drawing) of a battery (not shown in the drawing), a sensor mounting part 914 adjacent to the battery attaching part 913 in the direction separating from the battery, a terminal freely insert hole 915 for freely inserting the external output terminal 907 and an electric wire connecting part 921 to which a terminal fitting of an electric wire connected to a load is connected.

The first flat plate part 909 includes the battery attaching part 913, the sensor mounting part 914 and the terminal freely insert hole 915. On the sensor mounting part 914, the Hall IC 904 connected to the circuit board 905 is mounted.

The second flat plate part 910 is extended orthogonally to an end of the first flat plate part 909 separating from the battery attaching part 913. The second flat plate part 910 is provided with the electric wire connecting part 921 to which the terminal fitting of the electric wire connected to the load is connected in an end part separating from the above-described end part.

SUMMARY OF THE INVENTION

Problems that the Invention is to Solve

However, in the above-described bus bar dev ice 901, the length of the bus bar device 901 in the longitudinal direction has a dimension in which the battery attaching part 913, the sensor mounting part 914, the external output terminal 907 freely inserted by the terminal freely insert hole 915 and the electric wire connecting part 921 are arranged. Accordingly, the length of the bus bar 902 is hardly shortened. When a layout of a vehicle is limited, the bus bar device 901 is hardly mounted.

Thus, the present invention takes notice of the problems as described above and it is an object of the present invention to provide a miniaturized bus bar device.

Means for Solving the Problems

In order to achieve the above object, there is provided a bus bar device comprising: a bus bar that is connected to a battery post provided in a battery; an insulative housing that covers the bus bar; a circuit board that is attached to the housing; and an electronic parts that is mounted on the circuit board, wherein the bus bar includes: a first flat plate part having a battery attaching part to which the battery post is attached; a second flat plate part having a parallel part parallel to the first flat plate part and an electric wire connecting part extended from the parallel part to connect a terminal fitting of an electric wire connected to a load; and a third flat plate part provided between the second flat plate part and the first flat plate part and arranged in parallel with the circuit board; and wherein the third flat plate part is provided in a direction intersecting with the first flat plate part.

Preferably, The bus bar device further comprises an external output terminal that outputs an electric signal from the electronic parts, the electric wire connecting part is provided in parallel with the third flat plate part; and one end part of the external output terminal is attached to the circuit board, and the external output terminal is arranged between the battery and the electric wire connecting part and extended in parallel with an extending direction of the electric wire connecting part.

Alternatively, it is preferable that one end part of the external output terminal is attached to the circuit board, and the external output terminal is arranged between the third flat plate part and the electric wire connecting part and extended in a direction intersecting with an extending direction of the electric wire connecting part.

Also, there is also provided a fusible link unit comprising: a fusible link; a bus bar that is integrally provided with the fusible link and is connected to a battery post provided in a battery; an insulative housing that covers the bus bar; a circuit board that is attached to the housing; and an electronic parts that is mounted on the circuit board, wherein the bus bar includes: a first flat plate part having a battery attaching part to which the battery post is attached; a second flat plate part having a parallel part parallel to the first flat plate part and an electric wire connecting part extended from the parallel part to connect a terminal fitting of an electric wire connected to a load; and a third flat plate part provided between the second flat plate part and the first flat plate part and arranged in parallel with the circuit board; and wherein the third flat plate part is provided in a direction intersecting with the first flat plate part.

Advantages of the Invention

As explained above, according to the above-described invention, the third flat plate part is parallel to the circuit board on which the electronic parts is mounted and extended in parallel with the direction intersecting (substantially orthogonal to) the first flat plate part. Accordingly, as compared with the usual bus bar device, in the bus bar device of the present invention, a dimension of the bus bar in the longitudinal direction is shortened by a dimension of the third flat plate part in the longitudinal direction. Thus, the bus bar device can be miniaturized.

Further, according to the above-described invention, the other end parts of the external output terminals are arranged between the electric wire connecting parts and the battery and extended in parallel with the electric wire connecting part. Accordingly, a blank space between the electric wire connecting parts and the battery can be effectively used and the bus bar device can be miniaturized.

As described above, the other end parts of the external output terminals are allowed to pass through between the electric wire connecting parts and the battery and extended in parallel with the electric wire connecting parts. Namely, when the other end parts of the external output terminals are extended in the direction orthogonal to an end face on which the battery post is provided, the battery is not restricted by a peripheral form of the battery post, and the battery can be mounted without considering the peripheral form of the battery post.

Also, when the other end parts of the external output terminals are arranged between the third flat plate part and the electric wire connecting parts and extended in the direction intersecting the electric wire connecting parts, the bus bar device is not restricted by a peripheral form of the battery post and can be mounted.

Further, the one end parts of the external output terminals are allowed to come close to an outer edge of the bus bar and fixed. When the external output terminals are fixed along the direction of width, since an area of the external output terminals in the vicinity of the bus bar is more reduced than a case that the external output terminals are fixed along the longitudinal direction of the third flat plate part of the bus bar, the transmission of heat of the external output terminals to the bus bar can be reduced. Thus, the bus bar device can be provided that can mitigate a distortion such as a warp or torsion of the bus bar due to an aged change and can be used for a long period time.

According to the above-described invention, the third flat plate part is parallel to the circuit board on which the electronic parts is mounted and extended in parallel with the direction intersecting (substantially orthogonal to) the first flat plate part. Accordingly, in the fusible link unit of the present invention, a dimension of the bus bar in the longitudinal direction is shortened by a dimension of the third flat plate part in the longitudinal direction. Thus, the fusible link unit can be miniaturized.

MODE FOR CARRYING OUT THE INVENTION

Now, a first exemplary embodiment of the present invention will be described below by referring to FIG. 1 to FIG. 6. A bus bar device 1 according to the first exemplary embodiment of the present invention is electrically connected to a battery plus post 52 of a below-described battery 50 through a battery terminal 54 and a stud bolt 55.

Figure 1:
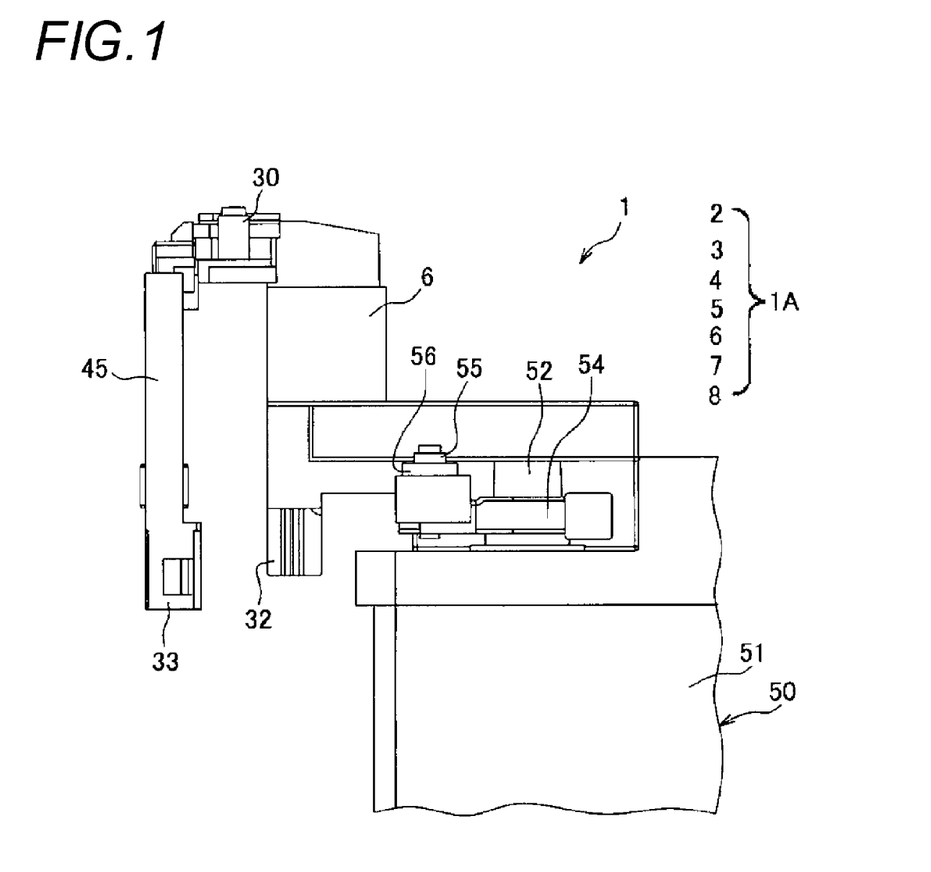
[FIG. 1] is a side view of a bus bar device according to a first exemplary embodiment of the present invention to which a battery is attached and a fusible link unit according to a third exemplary embodiment.

The battery 50 includes an accommodating case 51, the battery plus post (a battery post) 52 and a battery minus post (not shown in the drawing). The accommodating case 51 is formed with an insulating synthetic resin and formed in the shape of a box. The battery plus post 52 and the battery minus post are respectively formed substantially in cylindrical shapes and protrude from an end face of the accommodating case 51.

The bus bar device 1 includes a bus bar 2 connected to the battery plus post 52 provided in the battery 50 to supply a current thereto, a housing 3 that covers the bus bar 2, a circuit board 5 attached to the housing 3, a Hall IC (a magneto-electric conversion element) 4 as an electronic parts mounted on the circuit board 5, a core (a shield plate) 6, a plurality of external output terminals 7 that output electric signals from the Hall IC 4 and a cover part 8.

Figure 2:
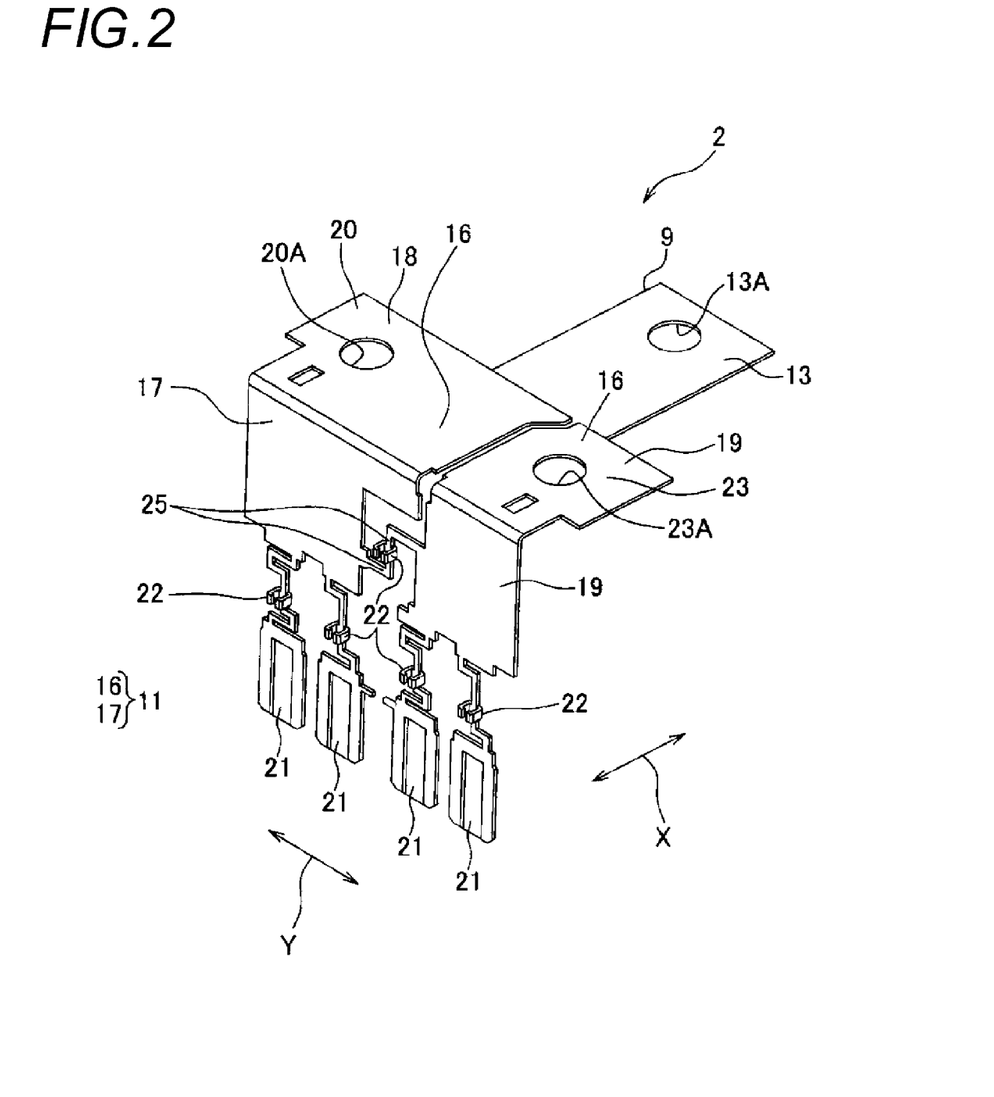
[FIG. 2] is a perspective view of the bus bar forming the bus bar device and the fusible link unit shown in FIG. 1.
Figure 3:
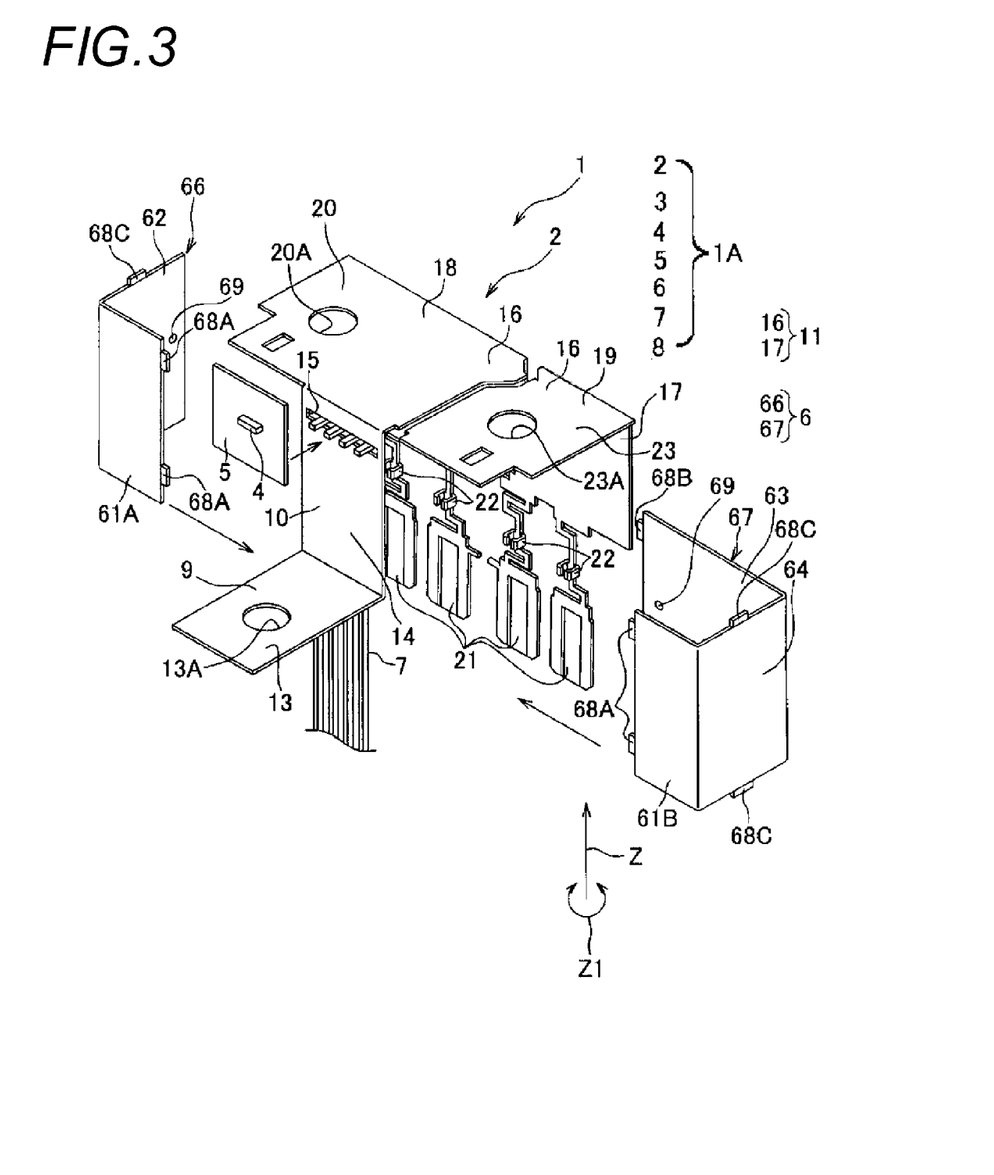
[FIG. 3] is an explanatory view for explaining an assembling operation of the bus bar device and the fusible link unit shown in FIG. 1, which shows a state that an external output terminal is attached to a bus bar that is not insert molded and a circuit board on which a Hall IC is mounted and a core are attached.

The bus bar 2 is formed by press working an electrically conductive plate. As shown in FIG. 2 and FIG. 3, the bus bar 2 includes a first flat plate part 9 having a battery attaching part 13 to which the battery plus post 52 is attached, a second flat plate part 11 and a third flat plate part 10 provided between the second flat plate part 11 and the first flat plate part 9 and parallel to the circuit board 5 and extended in the direction intersecting the first flat plate part 9.

The second flat plate part 11 is formed substantially in the shape of L by a first parallel part 16 parallel to the first flat plate part 9 and a second parallel part 17 connected to the first parallel part 16 and parallel to the third flat plate part 10.

The first flat plate part 9 is provided with the battery attaching part 13 to which the battery plus post 52 is attached.

The battery attaching part 13 is provided in the first flat plate part 9. In the battery attaching part 13, an attaching hole 13A is provided. The attaching hole 13A is a circular hole in its flat surface form which passes through the first flat plate part 9. The attaching hole 13A allows the stud bolt 55 to pass through. As shown in FIG. 1, to an end part of the stud bolt 55, the battery terminal 54 is attached. Namely, a nut 56 is screwed to the stud bolt 55 which is allowed to pass through the attaching hole 13A to connect (fix) the bus bar device 1 to the battery terminal 54. When the battery terminal 54 is attached to the battery plus post 52, the bus bar device 1 can be attached to the battery plus post 52 (namely, the battery 50) through the battery terminal 54 and the stud bolt 55.

The second flat plate part 11 includes a bus bar 18 for a starter, a bus bar 19 for an alternator, connecting pieces 25 which connect the bus bar 18 for the starter to the bus bar 19 for the alternator through the second parallel part 17, connecting terminals 21 as electric wire connecting parts to which terminal fittings of electric wires connected to a load and fusible links 22.

The bus bar 18 for the starter is provided with a starter connecting part 20 to which a wire harness (not shown in the drawing) for the starter connected to the starter (not shown in the drawing) is attached. The bus bar 18 for the starter is formed substantially in the shape of L and formed with a part of the first parallel part 16 and a part of the second parallel part 17. The bus bar 18 for the starter has an end part (namely, an end part of the first parallel part 16) extended from an end part in the third flat plate part 10 separating from the first flat plate part 9. The bus bar 18 for the starter and the bus bar 19 for the alternator are arranged with a space provided to each other in a direction Y orthogonal to a direction X (shown in FIG. 2) in which the one pair of the battery plus post 52 and the battery minus post are opposed to each other. The above-described direction X shows a "longitudinal direction of the bus bar 2".

Figure 4:
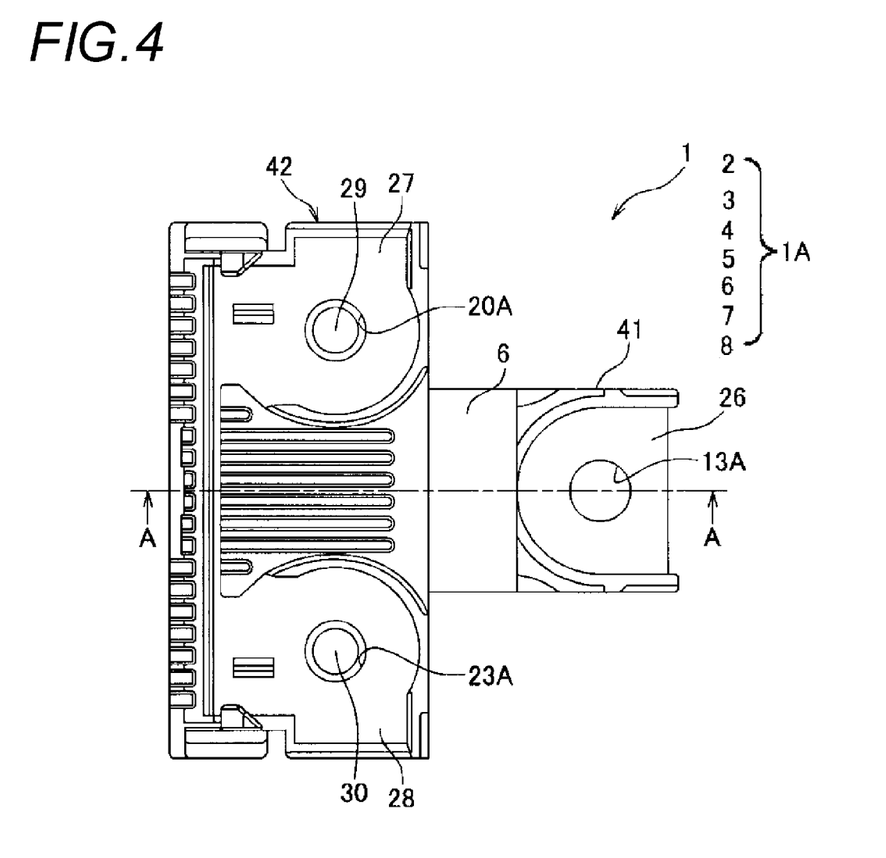
[FIG. 4] is a top view of the bus bar device and the fusible link unit shown in FIG. 1.

The starter connecting part 20 is provided in the first parallel part 16 of the bus bar 18 for the starter. In the starter connecting part 20, a connecting hole 20A is provided. The connecting hole 20A is a circular hole in its flat surface form which passes through the first parallel part 16. As shown in FIG. 4, to the connecting hole 20A, a below-described connecting bolt 29 made of a resin is inserted and fixed. Then, to the starter connecting part 20, a flat plate shaped terminal fitting (not shown in the drawing) provided in an end part of the wire harness for the starter (not shown in the drawing) is overlapped and connected. To the wire harness for the starter, the starter (not shown in the drawing) is connected. Then, the connecting bolt 29 is allowed to pass through a through hole (not shown in the drawing) provided in the terminal fitting of the wire harness for the starter. Thus, when a nut is screwed to the connecting bolt 29 which is allowed to pass through the terminal fitting of the wire harness for the starter, the wire harness for the starter is fixed to the bus bar 2 (namely, the bus bar device 1).

The bus bar 19 for the alternator is provided with an alternator connecting part 23 to which a wire harness (not shown in the drawing) for the alternator connected to the alternator (not shown in the drawing) is attached. The bus bar 19 for the alternator is formed substantially in the shape of L and formed with a part of the first parallel part 16 and a part of the second parallel part 17.

The alternator connecting part 23 is provided in the first parallel part 16 of the bus bar 19 for the alternator. In the alternator connecting part 23, a connecting hole 23A is provided. The connecting hole 23 is a circular hole in its flat surface form which passes through the first parallel part 16 of the bus bar 19 for the alternator. As shown in FIG. 4, to the connecting hole 23A, a below-described connecting bolt 30 made of a resin is inserted and fixed. Then, to the alternator connecting part 23, a flat plate shaped terminal fitting (not shown in the drawing) provided in an end part of the wire harness for the starter (not shown in the drawing) is overlapped and connected. To the wire harness for the alternator, the alternator (not shown in the drawing) is connected. Then, the connecting bolt 30 is allowed to pass through a through hole (not shown in the drawing) provided in the terminal fitting of the wire harness for the alternator. Thus, when a nut is screwed to the connecting bolt 30 which is allowed to pass through the terminal fitting of the wire harness for the alternator, the wire harness for the alternator is fixed to the bus bar 2 (namely, the bus bar device 1).

One pair of connecting 25 are provided. The one pair of connecting pieces 25 are provided between the bus bar 18 for the starter and the bus bar 19 for the alternator of the second parallel part 17. The one pair of connecting pieces 25 are connected to each other through the below-described fusible links 22. One connecting piece 25 of the one pair of connecting pieces 25 is formed integrally with the bus bar 18 for the starter. The other connecting piece 25 of the one pair of connecting pieces 25 is formed integrally with the bus bar 19 for the alternator.

For instance, four connecting terminals (electric connecting parts) 21 are provided. Two connecting terminals 21 are provided in an end part of the second parallel part 17 separating from the first parallel part 16 of the bus bar 18 for the starter through the fusible links 22. Remaining two connecting terminals 21 are provided in an end part of the second parallel part 17 separating from the first parallel part 16 of the bus bar 19 for the alternator through the fusible links 22. The connecting terminals 21 are formed in the shapes of flat plates. The connecting terminals 21 have one ends fitted to the terminal fittings (not shown in the drawing) provided in end parts of a wire harness (not shown in the drawing) for a load connected to the load (not shown in the drawing) and are connected to the load. The connecting terminals 21 are extended in parallel with the third flat plate part 10. Further, the connecting terminals 21 are extended in parallel with other end parts of the eternal output terminals 7.

The fusible links 22 are formed with metal whose melting point is relatively low and fused by a self-exothermic reaction when an over-current is supplied to the bus bar device 1. The fusible links 22 are provided integrally with the second flat plate part 11 (namely, the bus bar 2).

The third flat plate part 10 is extended from an end part of the first flat plate part 9 separating from the battery 50 and is provided in the direction intersecting (substantially orthogonal to) the first flat plate part 9. Further, the third flat plate part 10 is parallel to the below-described circuit board 5. The third flat plate part 10 includes a sensor mounting part 14 and a terminal loose insert hole 15.

The sensor mounting part 14 is provided in the third flat plate part 10. On a surface of the sensor mounting part 14 separating from the second parallel part 17, as shown in FIG. 3, the Hall IC 4 mounted on the circuit board 5 is arranged.

Figure 5:
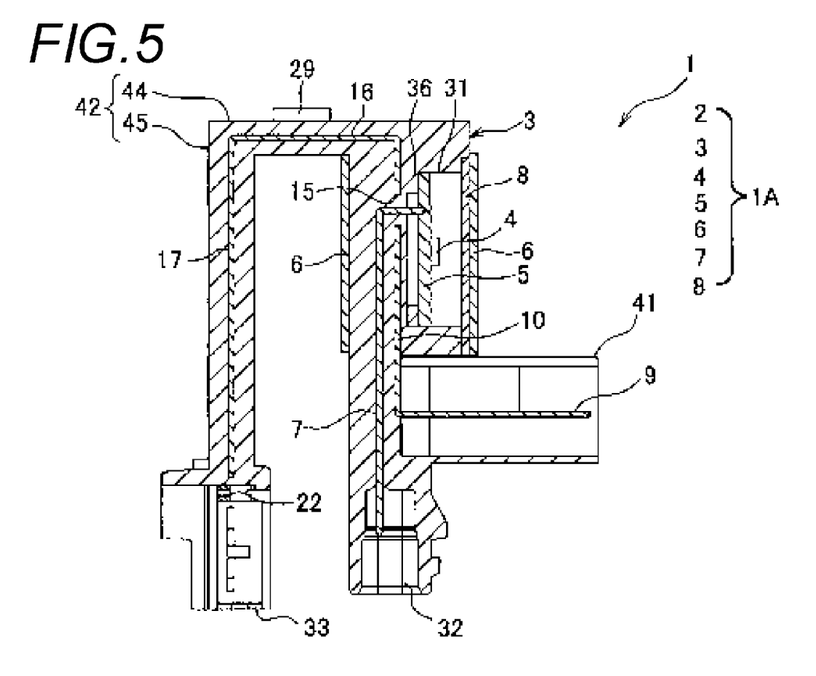
[FIG. 5] is a sectional view taken along a line A-A of the bus bar device and the fusible link unit shown in FIG. 4.
Figure 6:
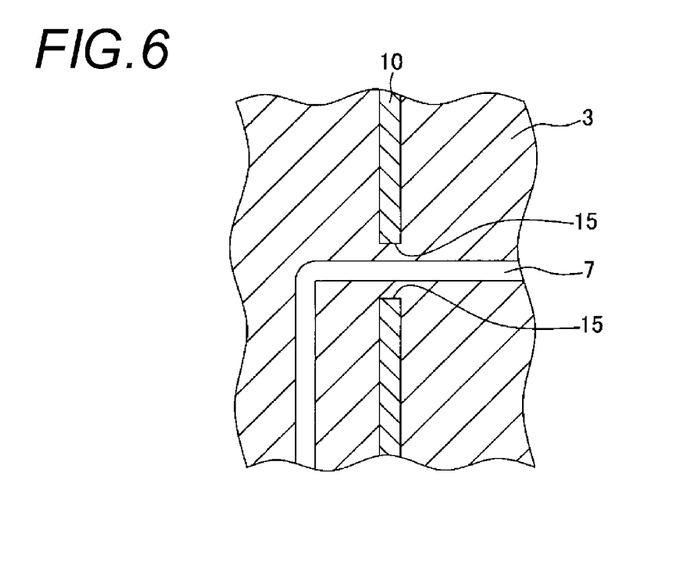
[FIG. 6] is an enlarged view of a main part showing that a terminal freely insert hole of the bus bar shown in FIG. 5 is enlarged.

The terminal loose insert hole 15 is provided in a rectangular form. The terminal loose insert hole 15 passes through the third flat plate part 10. The terminal loose insert hole 15 is provided in the sensor mounting part 14 adjacently to the second flat plate part 11 side. As shown in FIG. 5 and FIG. 6, into the terminal loose insert hole 15, the external output terminals 7 are loosely inserted and embedded by the housing 3. In such a way, the external output terminals 7 do not come into contact with the terminal loose insert hole 15 and are allowed to pass through (loosely inserted) the terminal loose insert hole 15 and fixed. Accordingly, the third flat plate part 10 (namely, the bus bar 2) is insulated from the external output terminals 7.

The housing 3 is formed with a synthetic resin relatively high in its heat resistance such as a nylon resin or a polypropylene resin. The housing 3 covers an entire part of the bus bar 2 and embeds the bus bar 2 and the external output terminals 7 by an insert molding.

The housing 3 includes a first coat part 41 with which the first flat plate part 9 of the bus bar 2 is coated, a second coat part 42 with which the second flat plate part 11 of the bus bar 2 is coated and a third coat part 43 with which the third flat plate part 10 of the bus bar 2 is coated.

The second coat part 42 is formed substantially in the shape of L by a horizontal part 44 with which the first parallel part 16 of the bus bar 2 is coated and a downward extending part 45 extended from the horizontal part 44 to coat the second parallel part 17 therewith.

The first coat part 41 includes an exposing part 26.

The exposing part 26 cuts out a part of both side surfaces of the first coat part 41 from an end part of the first coat part 41 separating from the third coat part 43. The exposing part 26 exposes outside the attaching hole 13A of the battery attaching part 13 of the first flat plate part 9 and a part near the attaching hole 13A.

The horizontal part 44 includes an exposing part 27 that exposes the starter connecting part 20 of the bus bar 2, the connecting bolt 29 that is allowed to pass through the connecting hole 20A, an exposing part 28 that exposes the alternator connecting part 23 of the bus bar 2 and the connecting bolt 30 that is allowed to pass through the connecting hole 23A.

The exposing part 27 cuts out a part of both surfaces of the horizontal part 44 from an end part of the horizontal part 44 near to the downward extending part 45. The exposing part 27 exposes outside the connecting hole 20A of the starter connecting part 20 and a part in the vicinity of the connecting hole 20A. The exposing part 28 cuts out a part of both surfaces of the horizontal part 44 from an end part of the horizontal part 44 near to the downward extending part 45. The exposing part 28 exposes outside the connecting hole 23A of the alternator connecting part 23 and a part in the vicinity of the connecting hole 23A.

As the connecting bolt 29, a bolt not shown in the drawing is inserted into the connecting hole 20A of the starter connecting part 20 and connected integrally to the housing 3. As the connecting bolt 30, a bolt not shown in the drawing is inserted into the connecting hole 23A of the alternator connecting part 23 and fixed integrally to the housing 3.

The second parallel part 17 of the bus bar 2 is integrally coated with the downward extending part 45. Namely, a part of the bus bar 18 for the starter, a part of the bus bar 19 for the alternator, the connecting pieces 25, the connecting terminals 21 and the fusible links 22 are integrally coated with the downward extending part 45. The downward extending part 45 is provided with a connecting terminal accommodating part 33 for accommodating the above-described connecting terminals 21 of the bus bar 2 in an end part separating from the horizontal part 44

The connecting terminal accommodating part 33 is formed in a tubular shape. The connecting terminal accommodating part 33 is provided integrally in the housing 3.

The third coat part 43 includes a case main body part 31 that accommodates the circuit board 5 and the Hall IC 4 mounted on the circuit board 5 and an output terminal accommodating part 32 that accommodates other end parts of the below-described external output terminals 7.

As shown in FIG. 5, the case main body part 31 is formed in the shape of a box having an opening in a direction separating from the downward extending part 45 and integrally embeds the third flat plate part 10 of the bus bar 2. The case main body part 31 is provided on the sensor mounting part 14 and the terminal loose insert hole 15 of the bus bar 2. The case main body part 31 includes a stepped part 36, a first positioning pin (not shown in the drawing) and a second positioning pin (not shown in the drawing) and four crimping and fitting parts (not shown in the drawing).

The stepped part 36 is provided in an inner side peripheral wall of the case main body part 31 and protrudes inward over an entire circumference thereof. On the stepped part 36, the circuit board 5 is overlapped and the case main body part 31 accommodates the circuit board 5.

The first positioning pin and the second positioning pin are respectively inserted into positioning holes 69 of the core 6 so that the core 6 and the third coat part 43 (that is, the housing 3) are positioned. The first positioning pin is provided upright from an edge in the direction of width (namely, a direction Y) of the case main body part 31 and provided in a first outer wall part (not shown in the drawing) of the exposing part 27 side. The second positioning pin is provided in an outer surface of the third coat part 43 opposed to the downward extending part 45. The first positioning pin and the second positioning pin are provided in the forms protruding outward in the housing 3.

The crimping and fitting parts are caulked by crimping pieces 68C of the core 6. For instance, four crimping and fitting parts are provided. As the four crimping and fitting parts, two crimping and fitting parts are respectively provided in a first outer wall part and a second outer wall part (not shown in the drawing) opposed to the first outer wall part. The crimping and fitting parts are grooves in the forms of recessed parts respectively provided on outer surfaces of one pair of first outer wall and second outer wall of the case main body part 31. The crimping and fitting parts are provided at both ends respectively in the longitudinal direction of the one pair of the first outer wall part and the second outer wall part and at central parts in the direction of width.

As shown in FIG. 5, the output terminal accommodating part 32 is provided in an end part of the third coat part 43 separating from the horizontal part 44 and provided so as to protrude from a surface of the first coat part 41 separating from the case main body part 31. The output terminal accommodating part 32 is provided integrally in the housing 3. The output terminal accommodating part 32 is formed in a tubular shape. The output terminal accommodating part 32 accommodates other end parts of the below-described external output terminals 7. As shown in FIG. 1, the output terminal accommodating part 32 is arranged between the connecting terminal accommodating part 33 and the battery 50.

The Hall IC (the electronic parts) 4 as the magneto-electric conversion element detects a magnetic flux density of a magnetic field generated when a current is supplied to the bus bar 2 to convert the magnetic flux density to an electric signal and output the electric signal. The Hall IC 4 is connected to the circuit board 5 through a terminal (not shown in the drawing) of the Hall IC 4. The Hall IC 4 is attached to one surface of the circuit board 5. Then, the Hall IC 4 is accommodated in the case main body part 31 of the housing 3. The Hall IC 4 is arranged on the sensor mounting part 14 of the bus bar 2. To the Hall IC 4, a power is supplied from the external output terminals 7 through the circuit board 5.

The circuit board 5 is formed in the shape of a flat plate. The circuit board 5 has the other surface opposite to the one surface on which the Hall IC 4 of the circuit board 5 is mounted is overlapped on the stepped part 36 of the case main body part 31. In such a way, when the circuit board 5 is overlapped on the stepped part 36 of the case main body part 31, the circuit board 5 is parallel to the third flat plate part 10 of the bus bar 2. As shown in FIG. 3, the circuit board 5 has the other surface provided with a terminal insert hole (not shown in the drawing). The terminal insert hole is inserted to the one end parts of the external output terminals 7 to connect the circuit board 5 to the external output terminals 7. On the circuit board 5, an electrically conductive pattern is formed for connecting the terminal of the Hall IC 4 to the external output terminals 7.

As shown in FIG. 3, the core 6 is arranged so as to surround an axis Z as a direction in which the current is supplied in the sensor mounting part 14 of the third flat plate part 10 of the bus bar 2. The core 6 is formed substantially in a rectangular annular shape in section. The core 6 includes upper plate parts 61A and 61B, a lower plate part 63 opposed to the upper plate parts 61A and 61B, a first side plate part 62 extended from an edge of the upper plate part 61A and one edge of the lower plate part 63 and a second side plate part 64 connected to an edge of the upper plate part 61B and the other edge of the lower plate part 63. The first side plate part 62 is opposed to the second side plate part 64. A gap (not shown in the drawing) is provided between the upper plate parts 61A and 61B. Namely, in a center of a direction Z1 around the axis Z, the gap is provided.

Further, the core 6 is divided to two parts of a first split shield plate 66 and a second split shield plate 67. The first split shield plate 66 includes the upper plate part 61A and the first side plate part 62 connected to the upper plate part 61A. The second split shield plate 67 includes the upper plate part 61B, the second side plate part 64 extended from the upper plate part 61B and the lower plate part 63 extended from the second side plate part 64 and opposed to the upper plate part 61B.

The first split shield plate 66 and the second split shied plate 67 of the core 6 divided in such a way are attached so as to surround the direction of the axis Z of the case main body part 31. At this time, the upper plate parts 61A and 61B are attached to the cover part 8 attached so as to cover the opening of the case main body part 31. The gap provided between the upper plate parts 61A and 61B is provided on the surface of the third coat part 43 separating from the downward extending part 45. When the core 6 is attached to the case main body part 31 in such a way as described above, the Hall IC 4 is arranged in a space surrounded by the core 6.

Further, the core 6 is provided with crimping pieces 68A for attaching the first split shield plate 66 and the second split shield plate 67 to the cover part 8, crimping pieces 68B, crimping and fitting parts (not shown in the drawing) caulked by the crimping pieces 68B, the crimping pieces 68C for attaching the first split shield plate 66 and the second split shield plate 67 to the case main body part 31 and the two positioning holes 69. The crimping pieces 68A are caulked to crimping and fitting parts (not shown in the drawing) of the cover part 8.

For instance, four crimping pieces 68A are provided. The two crimping pieces 68A are provided in the first split shield plate 66. The crimping pieces 68A are provided so as to protrude from the edge of the upper plate part 61A of the first split shield plate 66 opposite to the upper plate part 61B of the second split shield plate 67 when the cover part 8 is attached so as to cover the opening of the case main body part 31 and longitudinally spaced from each other. The two crimping pieces 68A are provided in the second split shield plate 67. The crimping pieces 68A are provided so as to protrude from the edge of the upper plate part 61B of the second split shield plate 67 opposite to the upper plate part 61A of the first split shield plate 66 when the cover part 8 is attached so as to cover the opening of the case main body part 31 and longitudinally spaced from each other.

For instance, two crimping pieces 68B are provided only in the second split shield plate 67. The crimping pieces 68B are provided so as to protrude from the edge of the lower plate part 63 of the second split shield plate 67 that comes close to the first side plate part 62 of the first split shield plate 66 when the second split shield plate 67 is attached to the case main body part 31 and longitudinally spaced from each other.

For instance, two crimping and fitting parts are provided only in the first split shield plate 66. The crimping and fitting parts are provided in the end part of the first side plate part 62 separating from the upper plate part 61A and grooves provided in recessed forms from an outer surface thereof. The crimping and fitting parts are provided to be spaced from each other in the longitudinal direction of the first side plate part 62.

For instance, the four crimping pieces 68C are provided in the core 6. The two crimping pieces 68C are provided in the first split shield plate 66. The crimping pieces 68C are provided so as to protrude from both edges in the longitudinal direction of the first side plate part 62 when the first split shield plate 66 is attached to the case main body part 31 and provided at central parts in the direction of width thereof. The two crimping pieces 68C are provided in the second split shield plate 67. The crimping pieces 68C are provided so as to protrude from both edges in the longitudinal direction of the second side plate part 64 when the second split shield plate 67 is attached to the case main body part 31 and provided at central parts in the direction of width thereof.

For instance, the two positioning holes 69 are provided. Into the two positioning holes 69, the first positioning pin and the second positioning pin provided in the case main body part 31 are respectively inserted. The positioning holes 69 pass through the core 6. One positioning hole 69 is provided in an end part of the first side plate part 62 of the first split shield plate 66 separating from the upper plate part 61A and provided at a central part in the direction of width thereof. The other positioning hole 69 is provided at an end part of the lower plate part 63 of the second split shield plate 67 separating from the second side plate part 64 and provided at a central part in the direction of width thereof.

In an illustrated example, the four external output terminals 7 are provided. As shown in FIG. 3, the four external output terminals 7 are arranged along the direction of width (namely, the direction Y) of the third flat plate part 10 of the bus bar 2. As shown in FIG. 5, the external output terminals 7 are loosely inserted into the terminal loose insert hole 15 of the bus bar 2 and embedded integrally in the housing 3. The external output terminals 7 output outside the electric signal outputted by the above-described Hall IC 4. Further, as described above, the external output terminals 7 supply the electric power to the Hall IC 4 through the circuit board 5. The external output terminals 7 are formed in the shapes of L. One end parts of the external output terminals 7 are loosely inserted into the terminal loose insert hole 15 of the bus bar 2, and then, inserted into the terminal insert hole of the circuit board 5. Further, the other end parts of the external output terminals 7 are accommodated in the output terminal accommodating part 32. The external output terminals 7 have their other end parts arranged between the connecting terminals 21 of the bus bar 2 and the battery 50. Thus, the other end parts of the external output terminals 7 are extended in parallel with the connecting terminals 21 of the bus bar 2.

The cover part 8 is attached so as to cover the opening of the case main body part 31 to prevent a foreign material such as dust or water from entering the case main body part 31. The cover part 8 is formed with a non-magnetic member. The cover part 8 is provided with the crimping and fitting parts caulked by the crimping pieces 68A of the core 6.

The crimping and fitting parts are grooves provided in recessed forms from one outer surface of the cover part 8 when the cover part 8 is attached to the case main body part 31.

Now, a procedure for assembling the bus bar device 1 will be described below. As described above, the bus bar 2 and the external output terminals 7 are embedded integrally in the housing 3 by the insert molding. At this time, the one end parts of the external output terminals 7 are loosely inserted into the terminal loose insert hole 15 of the bus bar 2. Then, the other end parts of the external output terminals 7 are arranged between the connecting terminals 21 and the battery 50 and extended in the same direction as that of the connecting terminals 21. In such a way, the external output terminals 7 are embedded in the housing 3 (anchored). Then, the terminal of the Hall IC 4 is soldered and connected to one surface of the circuit board 5. Thus, the Hall IC 4 is mounted on the circuit board 5 and the circuit board 5 is electrically connected to the Hall IC 4. Then, the circuit board 5 is allowed to come close to the opening of the case main body part 31 with the other surface of the circuit board 5 facing the opening of the case main body part 31. Then, the one end parts of the external output terminals 7 are inserted into the terminal insert hole of the circuit board 5. Thus, the one end parts of the external output terminals 7 are soldered and connected to the circuit board 5. In such a way, the external output terminal 7 are electrically connected to the circuit board 5. The other surface of the circuit board 5 is overlapped on the stepped part 36. Thus, the circuit board 5 is accommodated in the case main body part 31. Then, the other outer surface of the cover part 8 opposite to the one outer surface of the cover part 8 is allowed to come close to the opening of the case main body part 31 and attached thereto so that the opening is covered with the cover part 8. Finally, the upper plate part 61A of the core 6 is allowed to come close to the cover part 8 to insert the first positioning pin into the positioning hole 69 of the first split shield plate 66. Then, the upper plate part 61B is allowed to come close to the cover part 8 to insert the second positioning pin into the positioning hole 69 of the second split shield plate 67. Thus, the first split shield plate 66 and the second split shield plate 67 are positioned to the case main body part 31. After that, the crimping pieces 68A, 68B and 68C are caulked to attach the first split shield plate 66 and the second split shield plate 67 to the case main body part 31 and the cover part 8. Thus, the cover part 8 is attached to the case main body part 31. Then, the core 6 is attached to the housing 3. In such a way, the bus bar device 1 is completed.

According to the above-described bus bar device 1, the third flat plate part 10 is parallel to the circuit board 5 on which the Hall IC 4 as the electronic parts is mounted and extended in the direction intersecting (substantially orthogonal to) the first flat plate part 9. Accordingly, as compared with the usual bus bar device 901, in the bus bar device 1 of the present invention, a dimension of the bus bar 2 in the longitudinal direction (namely, the direction X) is shortened by a dimension of the third flat plate part 10 in the longitudinal direction. Therefore, the bus bar device 1 can be miniaturized.

The other end parts of the external output terminals 7 are arranged between the connecting terminals 21 and the battery 50 and extended in parallel with the connecting terminals 21. Accordingly, a blank space between the connecting terminals 21 and the battery 50 can be effectively used and the bus bar device 1 can be miniaturized.

Further, the one end parts of the external output terminals 7 are loosely inserted into the terminal loose insert hole 15 of the bus bar 2. Then, the other end parts of the external output terminals 7 are arranged between the connecting terminals 21 as the electric wire connecting parts and the battery 50 and extended in parallel with the connecting terminals 21. Namely, the other end parts of the external output terminals 7 are extended in the direction orthogonal to an end face on which the battery plus post 52 is provided. Accordingly, since the battery 50 is not restricted by a peripheral form of the battery plus post 52, the battery 50 can be mounted without considering the peripheral form of the battery plus post 52.

Now, a bus bar device 101 according to a second exemplary embodiment of the present invention will be described below by referring to FIG. 7 to FIG. 8. The same components as those of the above-described first exemplary embodiment are designated by the same reference numerals and a duplicated explanation will be omitted.

The bus bar device 101 includes a bus bar 102 connected to a battery plus post 52 provided in a battery 50 to supply a current thereto, a housing 103 that covers the bus bar 102, a circuit board 5 attached to the housing 103, a Hall IC (an electronic parts) 4 as a magneto-electric conversion element mounted on the circuit board 5, a core 106 as a shield plate, a plurality of external output terminals 7 that output electric signals from the Hall IC 4 and a cover part 8.

The bus bar 102 is formed by press working an electrically conductive plate. As shown in FIG. 8, the bus bar 102 includes a first flat plate part 9 having a battery attaching part 13 to which the battery plus post 52 is attached, a second flat plate part 11 and a third flat plate part 100 provided between the second flat plate part 11 and the first flat plate part 9 and parallel to the circuit board 5 and extended in the direction intersecting the first flat plate part 9.

The third flat plate part 100 is extended from an end part of the first flat plate part 9 separating from the battery 50 and is extended in the direction intersecting (substantially orthogonal to) the first flat plate part 9. Further, the third flat plate part 100 is parallel to the below-described circuit board 5. The third flat plate part 100 includes a sensor mounting part 14 and a cut out part 115.

The cut out part 115 cuts out an edge of the third flat plate part 100 in the direction of width near a bus bar 18 for a starter in the direction Y. The cut out part 115 is provided in a central part of the third flat plate part 100 in the longitudinal direction.

The housing 103 includes a first coat part 41 with which the first flat plate part 9 of the bus bar 102 is coated, a second coat part 42 with which the second flat plate part 11 of the bus bar 102 is coated and a third coat part 43 with which the third flat plate part 100 of the bus bar 102 is coated.

The third coat part 43 includes a case main body part 131 that accommodates the circuit board 5 and the Hall IC 4 mounted on the circuit board 5 and an output terminal accommodating part 32 that accommodates other end parts of the below-described external output terminals 7.

Figure 7:
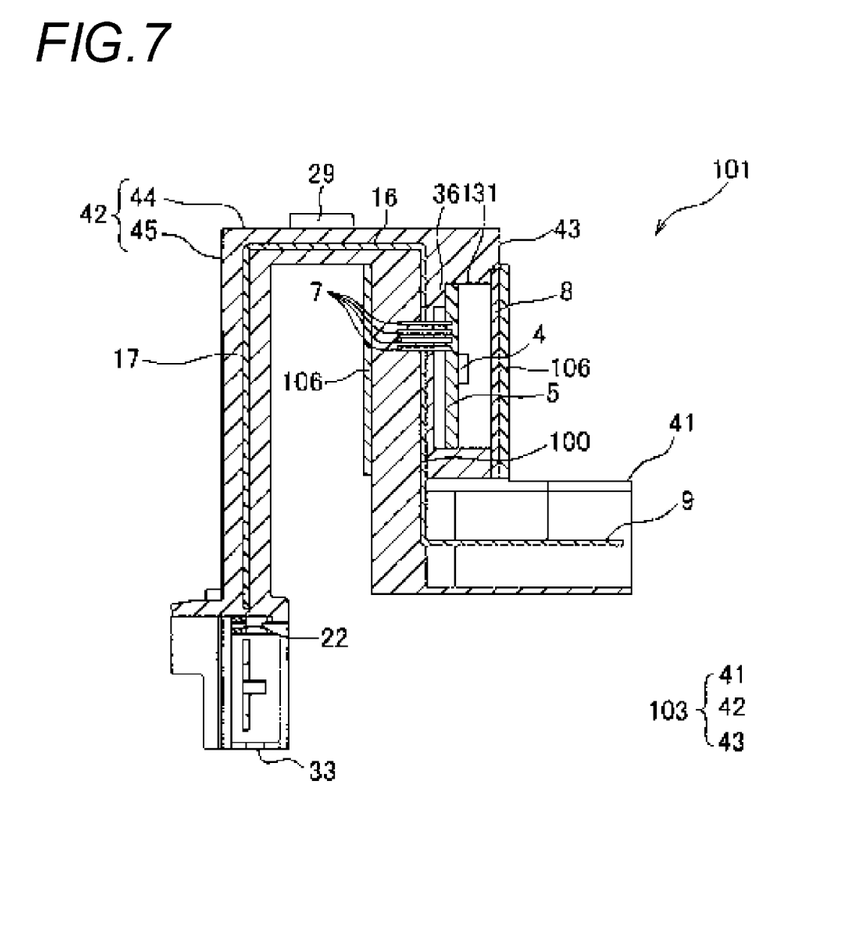
[FIG. 7] is a sectional view of a bus bar device according to a second exemplary embodiment.

As shown in FIG. 7, the case main body part 131 is formed in the shape of a box having an opening in a direction separating from a downward extending part 45 and integrally embeds the third flat plate part 100 of the bus bar 102. It is to be understood that the case main body part 131 is provided on the sensor mounting part 14 and the cut out part 115 of the bus bar 102. The case main body part 131 includes a stepped part 36, a first positioning pin (not shown in the drawing) and a second positioning pin (not shown in the drawing) and three crimping and fitting parts (not shown in the drawing).

The crimping and fitting parts are caulked by crimping pieces 68C of the core 106. The crimping and fitting parts are grooves in the forms of recessed parts respectively provided on outer surfaces of one pair of first outer wall part and second outer wall part of the case main body part 131. For instance, three crimping and fitting parts are provided. The two crimping and fitting parts are provided at both end parts respectively in the longitudinal direction of the first outer wall part and at central parts in the direction of width thereof. One remaining crimping and fitting part is provided in the second outer wall part (not shown in the drawing) opposed to the first outer wall part, provided in an end part of the second outer wall part in the longitudinal direction near the first coat part 41 and provided at a central part in the direction of width thereof.

As shown in FIG. 7, the core 106 is arranged so as to surround an axis Z as a direction in which a current is supplied in the sensor mounting part 14 of the bus bar 102. The core 106 is formed substantially in a rectangular annular shape in section. The core 106 includes upper plate parts 61A and 61B, a lower plate part 63 opposed to the upper plate parts 61A and 61B, a first side plate part 62 connected to an edge of the upper plate part 61A and an edge of the lower plate part 63 and a second side plate part 164 connected to an edge of the upper plate part 61B and an edge of the lower plate part 63. The first side plate part 62 is opposed to the second side plate part 164. A gap (not shown in the drawing) is provided between the upper plate parts 61A and 61B. Namely, in a center of a direction Z1 around the axis Z, the gap is provided.

Further, the core 106 is divided to two parts of a first split shield plate 66 and a second split shield plate 167. The first split shield plate 66 includes the upper plate part 61A and the first side plate part 62 extended from the upper plate part 61A. The second split shield plate 167 includes the upper plate part 61B, the second side plate part 164 extended from the upper plate part 61B and the lower plate part 63 extended from the second side plate part 164 and opposed to the upper plate part 61B.

The second split shield plate 167 is provided with a slit 165. The slit 165 is provided in an edge of the second side plate part 164 in the longitudinal direction near a bus bar 19 for an alternator and cut out from a central part in the direction of width thereof so as to have an opening. The slit 165 is linearly extended in the longitudinal direction of the second side plate part 164. The slit 165 passes through the second side plate part 164. Further, through the opening of the slit 165, central parts of the external output terminals 7 located between the above-described one end parts and the other end parts of the external output terminals 7 are allowed to pass.

Figure 8:
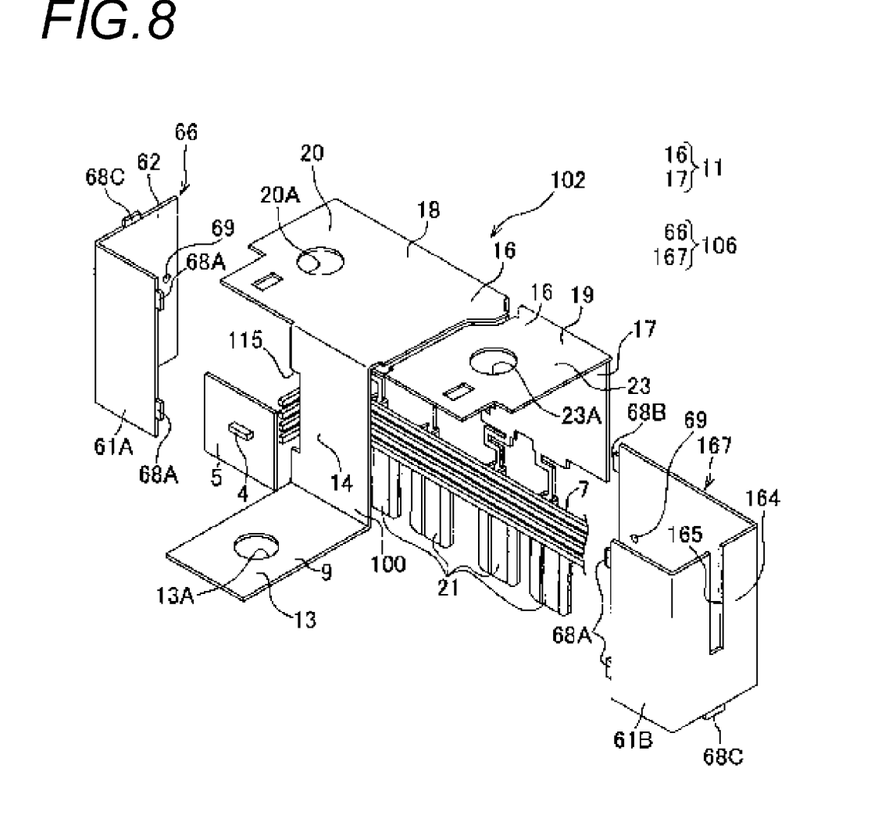
[FIG. 8] is an explanatory view for explaining an assembling operation of the bus bar device shown in FIG. 7, which shows a state that an external output terminal is attached to a bus bar that is not insert molded and a circuit board on which a Hall IC is mounted and a core are attached.

In an illustrated example, the four external output terminals 7 are provided as shown in FIG. 8. The four external output terminals 7 are arranged along the longitudinal direction of the third flat plate part 100 of the bus bar 102. The external output terminals 7 have the one end parts allowed to come close to the cut out part 115 of the bus bar 102 and embedded integrally in the housing 103. Further, the other end parts of the external output terminals 7 are accommodated in the output terminal accommodating part 32. The external output terminals 7 have their other end parts arranged between the third flat plate part 100 and connecting terminals 21 of the bus bar 102. The other end parts of the external output terminals 7 are extended in the direction intersecting the connecting terminals 21 of the bus bar 102.

As described above, the external output terminals 7 are embedded by the housing 103 by an insert molding. Accordingly, since the external output terminals 7 are coated with the housing 103, the central parts (namely, the external output terminals 7) of the external output terminals 7 do not come into contact with (insulated) the slit 165 (namely, the core 106).

Now, a procedure for assembling the bus bar device 101 will be described below. As described above, the bus bar 102 and the external output terminals 7 are embedded integrally in the housing 103 by the insert molding. At this time, the one end parts of the external output terminals 7 are allowed to come close to the cut out part 115 of the bus bar 102 and fixed. Then, the other end parts of the external output terminals 7 are arranged between the third flat plate part 100 and the connecting terminals 21 and extended in the direction intersecting the connecting terminals 21. The external output terminals 7 are embedded in the housing 103 (anchored) in the above-described position. Then, a terminal of the Hall IC 4 is soldered and connected to one surface of the circuit board 5. Thus, the Hall IC 4 is mounted on the circuit board 5 and the circuit board 5 is electrically connected to the Hall IC 4. Then, the circuit board 5 is allowed to come close to the opening of the case main body part 131 with the other surface of the circuit board 5 facing the opening of the case main body part 131. Then, the one end parts of the external output terminals 7 are inserted into the terminal insert hole of the circuit board 5. Thus, the one end parts of the external output terminals 7 are soldered and connected to the circuit board 5. In such a way, the external output terminals 7 are electrically connected to the circuit board 5. Then, the other surface of the circuit board 5 is overlapped on the stepped part 36. Thus, the circuit board 5 is electrically connected to the external output terminals 7. Then, the other outer surface opposite to one outer surface of the cover part 8 is allowed to come close to the opening of the case main body part 131 and attached thereto so that the opening is covered with the cover part 8. Finally, the upper plate part 61A of the core 106 is allowed to come close to the cover part 8 to insert the first positioning pin into a positioning hole 69 of the first split shield plate 66. Them, the upper plate part 61B is allowed to come close to the cover part 8 to insert the second positioning pin into a positioning hole 69 of the second split shield plate 167. Thus, the first split shield plate 66 and the second split shield plate 167 are positioned to the case main body part 131. After that, the crimping pieces 68A, 68B and 68C are caulked to attach the first split shield plate 66 and the second split shield plate 167 to the case main body part 131 and the cover part 8. Thus, the cover part 8 is attached to the case main body part 131. Then, the core 106 is attached to the housing 103. In such a way, the bus bar device 101 is completed.

In the above-described bus bar device 101, the other end parts of the external output terminals 7 are arranged between the third flat plate part 100 and the connecting terminals 21 and extended in the direction intersecting the connecting terminals 21. Accordingly, the bus bar device 101 can be mounted without receiving a restriction due to a peripheral form of the battery plus post 52.

Further, the one end parts of the external output terminals 7 are fixed in the vicinity of the cut out part 115 of the bus bar 102. The four external output terminals 7 are arranged along the longitudinal direction of the third flat plate part 100 of the bus bar 102. Therefore, since an area of the external output terminals 7 is reduced in the vicinity of the bus bar 102, the transmission of heat of the external output terminals 7 to the bus bar 102 can be reduced. Thus, the bus bar device 101 can be provided that can mitigate a distortion such as a warp or torsion of the bus bar 102 due to an aged change and can be used for a long period time.

Now, a fusible link unit 1A according to a third exemplary embodiment of the present invention will be described below by referring to FIG. 1 to FIG. 6. The same components as those of the above-described first exemplary embodiment are designated by the same reference numerals and a duplicated explanation will be omitted.

The fusible link unit 1A includes fusible links 22, a bus bar 2 provided integrally with the fusible links 22 and connected to a battery plus post 52 provided in a battery 50 to supply a current thereto, a housing 3 that covers the bus bar 2, a circuit board 5 attached to the housing 3, a Hall IC (an electronic parts) 4 as a magneto-electric conversion element mounted on the circuit board 5, a core 6 as a shield plate, a plurality of external output terminals 7 that output electric signals form the Hall IC 4 and a cover part 8.

Now, a procedure for assembling the fusible link unit 1A will be described below. As described above, the bus bar 2 and the external output terminals 7 are embedded integrally in the housing 3 by the insert molding. At this time, one end parts of the external output terminals 7 are loosely inserted into a terminal loose insert hole 15 of the bus bar 2. Then, the other end parts of the external output terminals 7 are arranged between connecting terminals 21 and the battery 50 and extended in the same direction as that of the connecting terminals 21. In such a way, the external output terminals 7 are embedded in the housing 3 (anchored). Then, a terminal of the Hall IC 4 is soldered and connected to one surface of the circuit board 5. Thus, the Hall IC 4 is mounted on the circuit board 5 and the circuit board 5 is electrically connected to the Hall IC 4. Then, the circuit board 5 is allowed to come close to the opening of a case main body art 31 with the other surface of the circuit board 5 facing the opening of the case main body part 31. Then, the one end parts of the external output terminals 7 are inserted into the terminal insert hole of the circuit board 5. Thus, the one end parts of the external output terminals 7 are soldered and connected to the circuit board 5. In such a way, the external output terminal 7 are electrically connected to the circuit board 5. The other surface of the circuit board 5 is overlapped on a stepped part 36. Thus, the circuit board 5 is accommodated in the case main body part 31. Then, the other outer surface opposite to the one outer surface of the cover part 8 is allowed to come close to the opening of the case main body part 31 and attached thereto so that the opening is covered with the cover part 8. Finally, an upper plate part 61A of the core 6 is allowed to come close to the cover part 8 to insert a first positioning pin into a positioning hole 69 of a first split shield plate 66. Then, an upper plate part 61B is allowed to come close to the cover part 8 to insert a second positioning pin into a positioning hole 69 of a second split shield 67. Thus, the first split shield plate 66 and the second split shield plate 67 are positioned to the case main body part 31. After that, crimping pieces 68A, 68B and 68C are caulked to attach the first split shield plate 66 and the second split shield plate 67 to the case main body part 31 and the cover part 8. Thus, the cover part 8 is attached to the case main body part 31. Then, the core 6 is attached to the housing 3. In such a way, the fusible link unit 1A is completed.

According to the above-described fusible link unit 1A, a third flat plate part 10 is parallel to the circuit board 5 on which the Hall IC 4 as the electronic parts is mounted and extended in the direction intersecting (substantially orthogonal to) a first flat plate part 9. Thus, in the fusible link unit 1A of the present invention, a dimension of the bus bar 2 in the longitudinal direction (namely, a direction X) is shortened by a dimension of the third flat plate part 10 in the longitudinal direction. Therefore, the fusible link unit 1A can be miniaturized.

In the first exemplary embodiment and the third exemplary embodiment, the terminal insert hole 15 is provided substantially in a rectangular form into which the four external output terminals 7 can be loosely inserted. However, the present invention is not limited thereto. The terminal insert hole 15 may be formed in the shape of a hole into which the four external output terminals 7 can be respectively inserted.

Further, in the first exemplary embodiment and the third exemplary embodiment, the external output terminals 7 are arranged between the battery 50 and the connecting terminals 21 and extended in parallel with the connecting terminals 21. The other end parts of the external output terminals 7 are extended in the same direction as that of the connecting terminals 21. However, the present invention is not limited thereto, and the other end parts of the external output terminals 7 may be extended in parallel with the connecting terminals 21 and extended in the direction separating from the connecting terminals 21.

Further, in the second exemplary embodiment, the other end parts of the external output terminals 7 are arranged between the third flat plate part 100 and the connecting terminals 21 and extended in one direction intersecting (substantially orthogonal to) the connecting terminals 21. However, the present invention is not limited thereto. The other end parts of the external output terminals 7 may be arranged between the third flat plate part 100 and the connecting terminals 21 and extended in the other direction intersecting (substantially orthogonal to) the connecting terminals 21 and opposite to the one direction.

Further, the "electronic parts" corresponds to the Hall IC 4, however, the present invention is not limited thereto. The "electronic parts" may be, for instance, a temperature sensor used for measuring the temperature of liquid of the battery 50.

Further, the above-described exemplary embodiments merely show representative embodiments of the present invention and the present invention is not limited to the exemplary embodiment. Namely, the present invention may be variously modified and embodied within a range without deviating from a gist of the present invention.

The present invention is based on Japanese Patent Application (JP application No. 2009-070319) filed on Mar. 23, 2009, and the contents of which are incorporated herein by a reference.

Description of Reference Numerals and Signs 1. 101 . . . bus bar device
1A . . . fusible link unit
2, 102 . . . bus bar
3, 103 . . . housing
4 . . . Hall IC (electronic parts)
5 . . . circuit board
7 . . . external output terminal
9 . . . first flat plate part
10, 100 . . . third flat plate part
11 . . . second flat plate part
13 . . . battery attaching part
16 . . . parallel part
21 . . . connecting terminal (electric wire connecting part)
22 . . . fusible link
50 . . . battery
52 . . . battery plus post (battery post)

The invention claimed is:

1. A bus bar device comprising:
a bus bar that is connected to a battery post provided in a battery;
an insulative housing that covers the bus bar;
a circuit board that is attached to the housing; and
an electronic parts that is mounted on the circuit board,
wherein the bus bar includes:
a first flat plate part having a battery attaching part to which the battery post is attached;
a second flat plate part having a parallel part parallel to the first flat plate part and an electric wire connecting part extended from the parallel part to connect a terminal fitting of an electric wire connected to a load; and
a third flat plate part provided between the second flat plate part and the first flat plate part and arranged in parallel with the circuit board; and
wherein the third flat plate part is provided in a direction intersecting with the first flat plate part.

2. The bus bar device according to claim 1, further comprising:
an external output terminal that outputs an electric signal from the electronic parts,
wherein the electric wire connecting part is provided in parallel with the third flat plate part; and
wherein one end part of the external output terminal is attached to the circuit board, and the external output terminal is arranged between the battery and the electric wire connecting part and extended in parallel with an extending direction of the electric wire connecting part.

3. The bus bar device according to claim 1, further comprising:

an external output terminal that outputs an electric signal from the electronic parts, wherein the electric wire connecting part is provided in parallel with the third flat plate part; and wherein one end part of the external output terminal is attached to the circuit board, and the external output terminal is arranged between the third flat plate part and the electric wire connecting part and extended in a direction intersecting with an extending direction of the electric wire connecting part.

4. A fusible link unit comprising:

a fusible link;

a bus bar that is integrally provided with the fusible link and is connected to a battery post provided in a battery;

an insulative housing that covers the bus bar;

a circuit board that is attached to the housing; and an electronic parts that is mounted on the circuit board, wherein the bus bar includes:
- a first flat plate part having a battery attaching part to which the battery post is attached;
- a second flat plate part having a parallel part parallel to the first flat plate part and an electric wire connecting part extended from the parallel part to connect a terminal fitting of an electric wire connected to a load; and
- a third flat plate part provided between the second flat plate part and the first flat plate part and arranged in parallel with the circuit board; and wherein the third flat plate part is provided in a direction intersecting with the first flat plate part.

5. The fusible link unit according to claim 4, further comprising:

an external output terminal that outputs an electric signal from the electronic parts, wherein the electric wire connecting part is provided in parallel with the third flat plate part; and wherein one end part of the external output terminal is attached to the circuit board, and the external output terminal is arranged between the battery and the electric wire connecting part and extended in parallel with an extending direction of the electric wire connecting part.

6. The fusible link unit according to claim 4, further comprising:

an external output terminal that outputs an electric signal from the electronic parts, wherein the electric wire connecting part is provided in parallel with the third flat plate part; and wherein one end part of the external output terminal is attached to the circuit board, and the external output terminal is arranged between the third flat plate part and the electric wire connecting part and extended in a direction intersecting with an extending direction of the electric wire connecting part.

* * * * *